(12) United States Patent
Kim et al.

(10) Patent No.: US 10,843,704 B2
(45) Date of Patent: Nov. 24, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Insu Kim, Anyang-si (KR); Hoon Jang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 589 days.

(21) Appl. No.: 15/788,382

(22) Filed: Oct. 19, 2017

(65) Prior Publication Data
US 2018/0265096 A1  Sep. 20, 2018

(30) Foreign Application Priority Data
Mar. 20, 2017 (KR) .................. 10-2017-0034684

(51) Int. Cl.
*B60W 50/06* (2006.01)
*G06F 9/48* (2006.01)
(Continued)

(52) U.S. Cl.
CPC .......... *B60W 50/06* (2013.01); *B60W 50/14* (2013.01); *G06F 9/4887* (2013.01); *B60W 2050/0091* (2013.01); *B60W 2050/146* (2013.01)

(58) Field of Classification Search
None
See application file for complete search history.

(56) References Cited

U.S. PATENT DOCUMENTS 8,121,996 B2 * 2/2012 Andreev ................ G06F 8/24
707/705
8,495,651 B2 * 7/2013 Kanai ................ G06F 9/45537
718/107
(Continued)

FOREIGN PATENT DOCUMENTS

JP  2001-167060 A  6/2001
JP  2001-350639 A  12/2001
(Continued)

OTHER PUBLICATIONS

Chang Min Kyoung [KR]; Lee Joo Woo [KR]; Seo Kyung Hye [KR], KR101233214B1, English Translation (Year: 2013).*

*Primary Examiner* — Nicholas K Wiltey
(74) *Attorney, Agent, or Firm* — Morgan, Lewis & Bockius LLP

(57) ABSTRACT

A vehicle and a control method thereof are disclosed. The vehicle to which an automotive open system architecture (AUTOSAR) platform is applied, may include an information acquisition part configured to acquire information regarding a first task and information regarding a type and an execution time of each of functions that are executed in the first task from a process control block; and a controller configured to perform control to execute an unexecuted function in a second task when the unexecuted function is not executed or not completely executed in the first task but is present together with the functions that are executed in the first task. In accordance with the present disclosure, a function that is not executed from the beginning or a partially executed function in a task may be detected to be executed in another task so that a program can be more stably executed.

18 Claims, 14 Drawing Sheets

(51) Int. Cl.
*B60W 50/14* (2020.01)
*B60W 50/00* (2006.01)

(56) References Cited

U.S. PATENT DOCUMENTS

| | | | | |
|---|---|---|---|---|
| 8,856,196 | B2* | 10/2014 | Yamada | G06F 9/505 |
| | | | | 708/104 |
| 9,634,825 | B2* | 4/2017 | Shimizu | H04L 7/0016 |
| 9,747,139 | B1* | 8/2017 | Borlick | G06F 9/5094 |
| 10,275,280 | B2* | 4/2019 | Borlick | G06F 9/5044 |
| 10,289,448 | B2* | 5/2019 | Ra | G06F 9/4887 |
| 10,503,544 | B2* | 12/2019 | Lin | G06F 9/5066 |
| 2001/0003187 | A1* | 6/2001 | Aoki | G06F 9/5072 |
| | | | | 718/102 |
| 2002/0174164 | A1* | 11/2002 | Hayashi | G06F 9/4887 |
| | | | | 718/102 |
| 2003/0204549 | A1 | 10/2003 | Eibach et al. | |
| 2004/0268354 | A1* | 12/2004 | Kanai | G06F 9/45533 |
| | | | | 718/100 |
| 2005/0229177 | A1* | 10/2005 | Torii | G06F 9/4887 |
| | | | | 718/100 |
| 2006/0218551 | A1* | 9/2006 | Berstis | G06F 9/5038 |
| | | | | 718/102 |
| 2006/0218558 | A1* | 9/2006 | Torii | G06F 9/4887 |
| | | | | 718/107 |
| 2008/0282248 | A1 | 11/2008 | Tokumochi et al. | |
| 2009/0158015 | A1* | 6/2009 | Hillman | G06F 9/30181 |
| | | | | 712/226 |
| 2010/0174890 | A1* | 7/2010 | Hillman | G06F 9/30145 |
| | | | | 712/220 |
| 2010/0262971 | A1* | 10/2010 | Yamada | G06F 11/1641 |
| | | | | 718/104 |
| 2011/0035752 | A1* | 2/2011 | Krishnakumar | G06F 9/4881 |
| | | | | 718/103 |
| 2012/0177135 | A1* | 7/2012 | Gahinet | G05B 13/042 |
| | | | | 375/260 |
| 2012/0210160 | A1* | 8/2012 | Fuhrman | G06F 11/0739 |
| | | | | 714/4.12 |
| 2012/0221734 | A1* | 8/2012 | Adachi | H04W 88/06 |
| | | | | 709/227 |
| 2013/0191843 | A1* | 7/2013 | Sarkar | G06F 9/505 |
| | | | | 718/105 |
| 2013/0290925 | A1* | 10/2013 | Shankar | G06F 9/4496 |
| | | | | 717/105 |
| 2014/0052432 | A1* | 2/2014 | Deubzer | G06F 9/4881 |
| | | | | 703/21 |
| 2014/0089889 | A1* | 3/2014 | MacLay | G06F 8/35 |
| | | | | 717/104 |
| 2015/0248343 | A1* | 9/2015 | Ionescu | G06F 11/3688 |
| | | | | 717/130 |
| 2015/0363239 | A1* | 12/2015 | Hsu | G06F 9/5033 |
| | | | | 718/104 |
| 2016/0085587 | A1* | 3/2016 | Dube | G06F 9/5005 |
| | | | | 718/104 |
| 2016/0170470 | A1* | 6/2016 | Kannan | G06F 1/3287 |
| | | | | 713/324 |
| 2016/0259703 | A1* | 9/2016 | Kawai | G06F 11/3409 |
| 2016/0292012 | A1* | 10/2016 | Robatmili | G06F 9/5027 |
| 2017/0286161 | A1* | 10/2017 | Lim | G06F 9/4881 |
| 2018/0024837 | A1* | 1/2018 | Sadowski | G06F 9/3871 |
| | | | | 712/226 |
| 2018/0107507 | A1* | 4/2018 | Lin | G06F 9/5066 |
| 2018/0217942 | A1* | 8/2018 | Fons | G06F 12/1408 |
| 2019/0188057 | A1* | 6/2019 | Heissenberger | G06F 11/3409 |
| 2019/0294968 | A1* | 9/2019 | Vantrease | G06F 3/0673 |
| 2020/0026563 | A1* | 1/2020 | Bahramshahry | G06F 9/4881 |

FOREIGN PATENT DOCUMENTS

| | | |
|---|---|---|
| JP | 2008-276674 A | 11/2008 |
| JP | 2011-216004 A | 10/2011 |
| KR | 101233214 B1 * | 2/2013 |
| KR | 2014-0078344 A | 6/2014 |

* cited by examiner

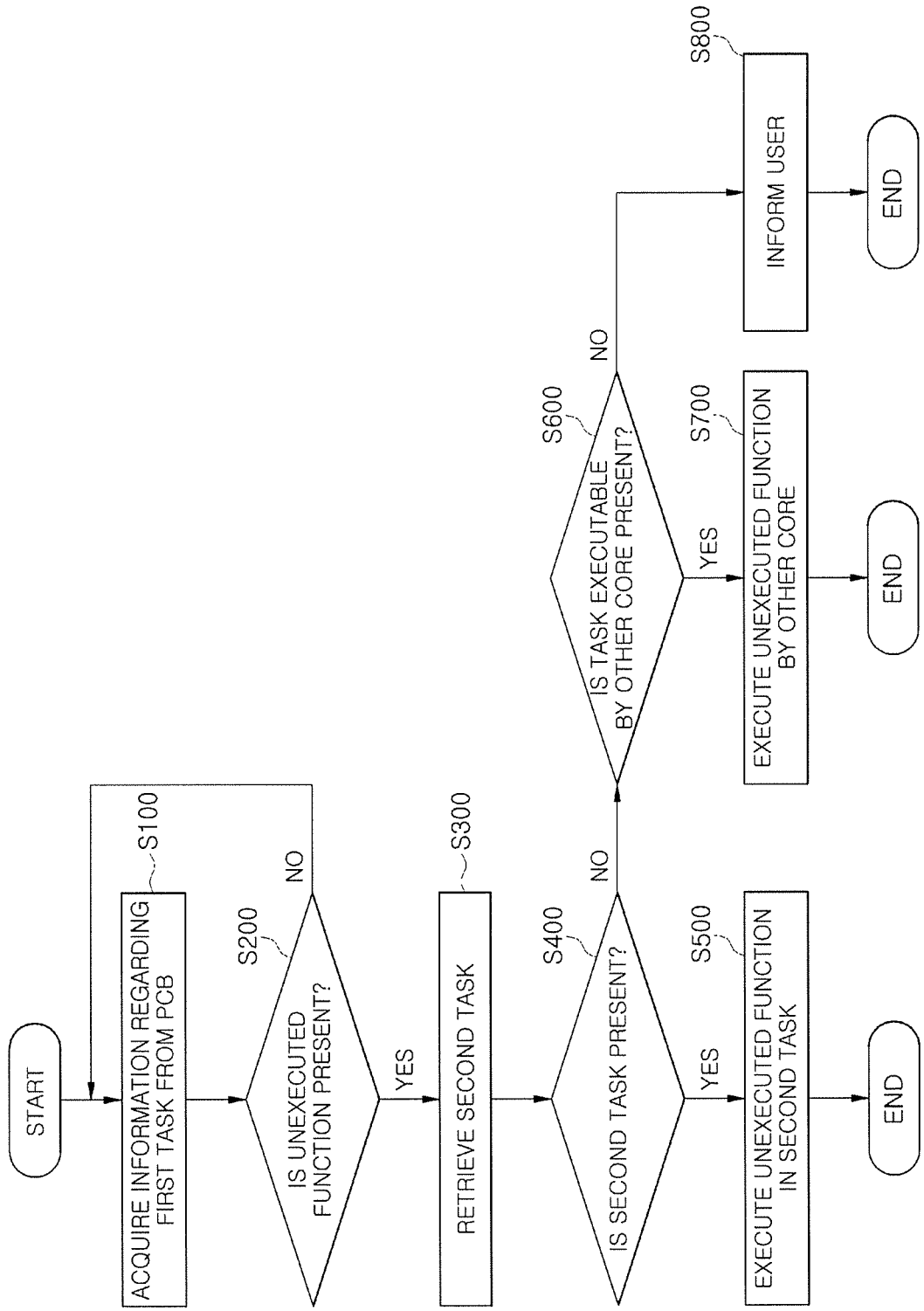

VEHICLE AND CONTROL METHOD THEREOF

CROSS-REFERENCE TO RELATED APPLICATION

This application claims the benefit of Korean Patent Application No. 10-2017-0034684, filed on Mar. 20, 2017 in the Korean Intellectual Property Office, the disclosure of which is incorporated herein by reference.

TECHNICAL FIELD

Embodiments of the present disclosure relate to a vehicle and a control method thereof, and more particularly, to technology for acquiring information regarding a task and for executing an unexecuted function and a remaining portion of the unexecuted function in another task when a function that is not executed from the beginning or a partially executed function is absent, in a vehicle to which an automotive open system architecture (AUTOSAR) platform is applied.

BACKGROUND

In modern society, an automobile is the most common mode of transportation, and the number of people using vehicles is increasing. Due to the development of automobile technology, there are many changes in life, such as facilitating in long distance travel, making life easier, and the like when compared to the past.

For the convenience of a driver, a plurality of electronic devices of an automobile, which include a hands-free device, a global positioning system (GPS) receiver, a Bluetooth device, a high-pass device, and the like, are being developed, and the new worth of the electrical/electronic field created among the automotive-related technology fields is gradually increasing.

An important part of the automotive electrical/electronic device field is embedded software technology, and operating system technology serves a key role in embedded software.

An automotive open system architecture (AUTOSAR) is a partnership which is cooperatively organized by automobile manufacturers and automotive part manufacturers to develop and establish practical industry standards for the structure of automotive software, and an OSEK (German: Offene Systeme und deren schnittstellen für die Elektronik in Kraftfahrzeugen; English: Open Systems and their Interfaces for the Electronics in Motor Vehicles) is a real-time operating system that is designed to be usable in an automobile. A module of the OSEK is defined to comply with an OSEK standard (that is, ISO 17356-3), and the OSEK provides a multitasking function, an event, a resource management function, an interrupt function, and the like.

However, many electrical/electronic parts are recently mounted in an automobile and many programs are frequently simultaneously executed, and in such a case, a problem in which a central processing unit (CPU) is overloaded to cause an incorrect operation of a program may occur.

Accordingly, in the related art, the CPU is prevented from being overloaded by assuming a task time and an actual execution time of a program using a micro controller unit (MCU) timer and then calculating a percentage between the task time and the actual execution time to provide the percentage to a user.

However, since calculation information regarding an execution time of each function which is executed in a task is absent in the related art, there are many problems in that a function which is not executed beyond a target time per task is not determined, and further technology for automatically solving the problem of an execution timeout does not exist.

SUMMARY

Therefore, it is an aspect of the present disclosure to provide a vehicle and a control method thereof, which are capable of more stably executing a program by determining in real time a status of a function that is executed in a task to detect an error and resolving the error when the error is detected.

Additional aspects of the disclosure will be set forth in part in the description which follows and, in part, will be obvious from the description, or may be learned by practice of the disclosure.

In accordance with one aspect of the present disclosure, there may be provided a vehicle, to which an automotive open system architecture (AUTOSAR) platform is applied, including an information acquisition part configured to acquire information regarding a first task and information regarding a type and an execution time of each of functions that are executed in the first task from a process control block; and a controller configured to perform control to execute an unexecuted function in a second task when the unexecuted function is not executed or not completely executed in the first task but is present together with the functions that are executed in the first task.

The unexecuted function may include a function that is not executed from the beginning in the first task, or a partially executed function in the first task.

The controller may determines that the second task has a time by subtracting a sum of the execution times of each of the functions, which have to be executed in the second task, from an entire time of the second task, the time of the second task being longer than a time required for executing the unexecuted function.

The controller may select one among a plurality of tasks which has a smallest ratio of the sum of the execution times of each of the functions to the entire time, as the second task.

The controller may select one among a plurality of tasks which is closest to the first task based on the first task, as the second task.

When a plurality of unexecuted functions are present, the controller may perform control to execute the plurality of unexecuted functions in a plurality of second tasks.

When the second task in which the unexecuted function is executable is absent, the controller may execute the unexecuted function by another core which is different from a core which executes the executed functions.

The vehicle may further include a display configured to inform a user of an absence of any core that is able to execute the unexecuted function.

When the other core able to execute the unexecuted function is absent, the controller may terminate execution of the functions according to a preset order.

The information acquisition part may acquire the information regarding the first task and the functions by inserting instrumentation code.

In accordance with another aspect of the present disclosure, there may be provided a method for controlling a vehicle, to which an automotive open system architecture (AUTOSAR) platform is applied, including acquiring information regarding a first task and information regarding a type and an execution time of each of functions that are executed in the first task from a process control block; determining whether an unexecuted function is not executed or not completely executed in the first task but is present together with the functions that are executed in the first task; and, when the unexecuted functions is present, performing control to execute the unexecuted functions in a second task.

The unexecuted function may include a function that is not executed from the beginning in the first task, or a partially executed function in the first task.

The method may further include determining that the second task has a time by subtracting a sum of the execution times of each of the functions, which have to be executed in the second task, from an entire time of the second task, the time of the second task being longer than a time required for executing the unexecuted function.

The method may further include selecting one among a plurality of tasks as the second task. The one task may have a smallest ratio of the sum of the execution times of each of the functions to the entire time among the plurality of tasks.

The method may further include selecting one among a plurality of tasks as the second task. The one task may be closest to the first task based on the first task among the plurality of tasks.

When a plurality of unexecuted functions are present, the performing of control may include performing control to execute the plurality of unexecuted functions in a plurality of second tasks.

When the second task in which the unexecuted function is executable is absent, the performing of control may further include executing the unexecuted function by another core which is different from a core that executes the executed functions.

The method may further include informing a user of an absence of any core that is able to execute the unexecuted function.

The method may further include: when the other core able to execute the unexecuted function is absent, terminating execution of the functions according to a preset order.

The acquiring of the information may include acquiring the information regarding the first task and the functions by inserting instrumentation code.

In accordance with the present disclosure, a function that is not executed from the beginning or a partially executed function in a task may be detected to be executed in another task so that there is an effect in which a program can be more stably executed.

BRIEF DESCRIPTION OF THE DRAWINGS

While the present disclosure will be described in detail with reference to the following drawings, since these drawings show preferred embodiments of the present disclosure, the technical spirit of the present disclosure should not be construed as being limited to these drawings.

FIG. 5 is a flowchart illustrating an operation sequence in the vehicle according to one embodiment of the present disclosure.

DETAILED DESCRIPTION

Figure 1:
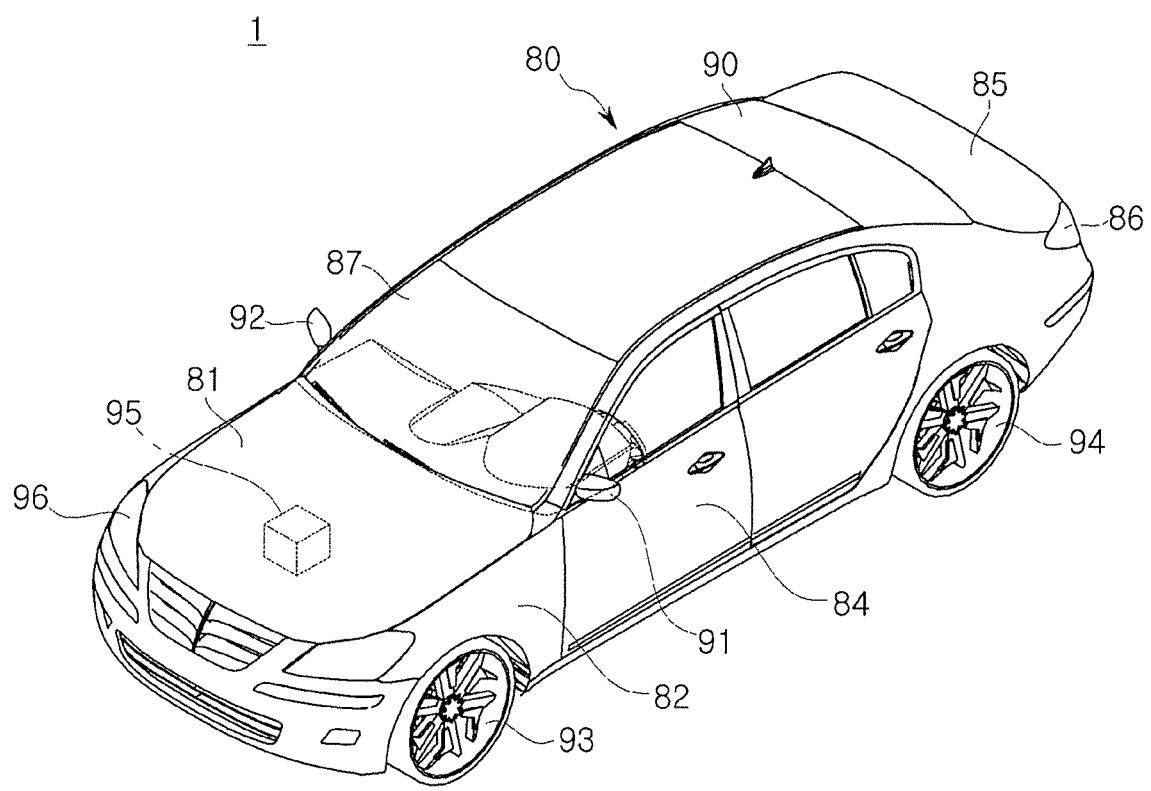
FIG. 1 is a diagram illustrating an exterior appearance of a vehicle according to one embodiment of the present disclosure.

Embodiments described herein and configurations shown in the drawings are preferred examples of the present disclosure, and there may be various modified examples that can replace the embodiments and drawings of the present disclosure at the time of filing of the present application.

Also, the terms used herein are used to describe the embodiments and are not intended to restrict and/or limit the present disclosure. Unless the context clearly dictates otherwise, the singular form includes the plural form.

The terms "comprise," "include," or "have" used herein specify the presence of stated features, numbers, steps, operations, components, elements, or a combination thereof unless clearly stated otherwise in the present application, but do not preclude the presence or addition of one or more features, numbers, steps, operations, components, elements, or a combination thereof.

Also, the terms including "ordinal numbers" such as "first," "second," and the like used herein can be used to describe various components, but the components are not limited by these terms.

Hereinafter, embodiments of the present disclosure will be fully described in detail with reference to the accompanying drawings so as to be implemented by those skilled in the art. Further, in order to clearly describe the present disclosure, portions not related to the description are omitted in the drawings. Hereinafter, a vehicle to which the present disclosure is applied will be described with reference to FIGS. 1 and 2.

FIG. 1 is a diagram illustrating an exterior appearance of a vehicle according to one embodiment of the present disclosure.

Referring to FIG. 1, a vehicle 1 according to one embodiment of the present disclosure may include a main body 80 configured to form an exterior appearance of the vehicle 1, wheels 93 and 94 configured to move the vehicle 1, a driving device 95 configured to rotate the wheels 93 and 94, a door 84 configured to block an interior of the vehicle 1 from an exterior thereof, a windshield 87 configured to provide a driver inside the vehicle 1 with a front view, side mirrors 91 and 92 configured to provide the driver with a rear view from the vehicle 1, and a rear window 90 installed at a rear side of the vehicle body 80 and configured to provide a rear view from the vehicle 1, and the vehicle body 80 may include a hood 81, a front fender 82, the door 84, a trunk lid 85, and a quarter panel 86.

The wheels 93 and 94 include a front wheel 93 provided at a front side of the vehicle 1 and a rear wheel 94 provided at a rear side of the vehicle 1, and the driving device 95 provides a rotational force to the front wheel 93 and the rear wheel 94 so that the main body 80 may move in a forward direction or a backward direction. Such a driving device 95 may employ an engine configured to generate a rotational force by burning fossil fuel, or a motor configured to generate a rotational force by receiving power supplied from a capacitor (not shown).

The door 84 may be pivotably provided at a left side and a right side of the main body 80 to enable a driver to get inside the vehicle 1 when open, and to block an interior of the vehicle 1 from the outside when closed.

The windshield 87 may be provided at an upper front side of the main body 80 to enable the driver inside the vehicle 1 to acquire visual information regarding a front direction from the vehicle 1. Also, the side mirrors 91 and 92 may include a left side mirror 91 provided at a left side of the main body 80 and a right side mirror 92 provided at a right side of the main body 80 to enable the driver inside the vehicle 1 to acquire visual information regarding a lateral direction and a rear direction from the vehicle 1.

In addition, the vehicle 1 may include a sensing device including a proximity sensor configured to sense a rear obstacle or another vehicle, a rain sensor configured to sense whether precipitation such as rain, snow, or hail is falling.

As one example, the proximity sensor may transmit a sensing signal in the lateral direction or the rear direction from the vehicle 1, and then receive a reflected signal from obstacles such as another vehicle and the like. Also, the proximity sensor may sense whether a rear obstacle of the vehicle 1 is present and detect a position of the rear obstacle on the basis of a waveform of the reflected signal that is received. Such a proximity sensor may employ a method of transmitting an ultrasound signal and detecting a distance until an obstacle using a reflected ultrasound signal from the obstacle.

Figure 2:
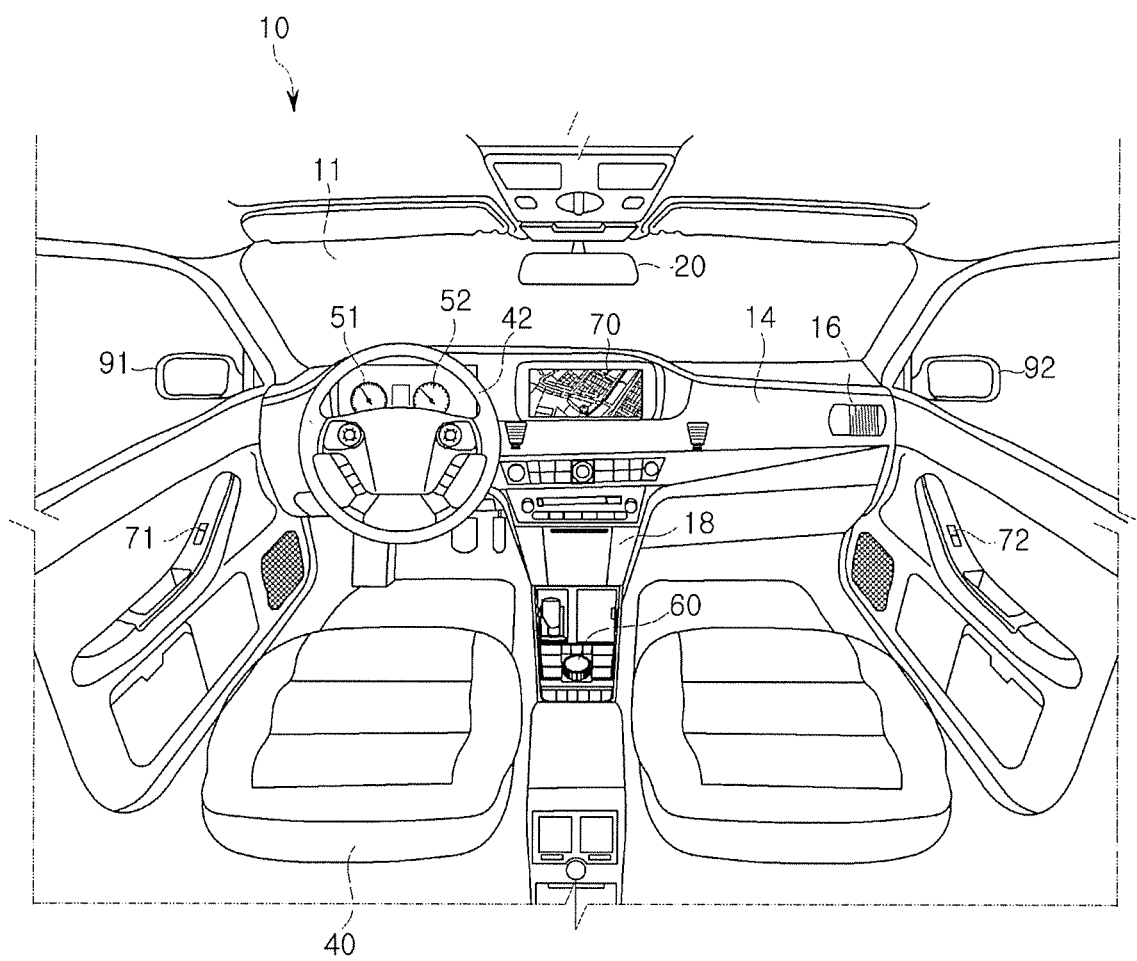
FIG. 2 is a diagram illustrating an interior appearance of the vehicle according to one embodiment of the present disclosure.

FIG. 2 is a configuration diagram illustrating an interior of the vehicle according to one embodiment of the present disclosure.

A telematics terminal (not shown) configured to communicate with the outside may be installed in a vehicle interior 10. Telematics is a combination of telecommunication and informatics, and it refers to a system enabling a driver to send and receive email in a vehicle or search for various types of information through the Internet.

The telematics terminal may be configured as a device that is provided with all of a computer, a wireless communication function, and a satellite navigation function. Therefore, the driver may connect to a telematics server, which is provided externally, using the telematics terminal, and, through such a telematics terminal, he or she may use various functions such as transmitting and receiving data, an image, and the like.

Since the telematics terminal is installed in the vehicle interior 10 and thus it is not an external device visible to the driver, the user generally may use a telematics function using a display 70 of the vehicle interior 10.

An air conditioning device 16 may be installed in the vehicle interior 10. The air conditioning device 16 refers to a device which automatically controls an air conditioning environment including interior and exterior environmental conditions of the vehicle 1, suction and discharge of air, circulation thereof, cooling and heating states, and the like, or controls the air conditioning environment according to a control command from a user. For example, the air conditioning device 16 may perform both cooling and heating operations, and may perform control a temperature in the vehicle interior 10 by discharging air, which is heated or cooled, through a vent.

Meanwhile, the vehicle interior 10 may include a dashboard 14 at which various devices configured to enable the driver to operate the vehicle 1 are installed, a driver seat 40 configured to enable the driver of the vehicle 1 to sit thereon, and cluster displays 51 and 52 configured to display operation information of the vehicle 1.

The dashboard 14 may protrude from a lower portion of the windscreen 11 toward the driver to enable the driver to manipulate the various devices installed at the dashboard 14 while looking ahead.

The driver seat 15 may be provided at the rear of the dashboard 14 to enable the driver to drive the vehicle 1 in a stable posture while looking ahead of the vehicle 1 and the various devices of the dashboard 14.

The cluster displays 51 and 52 may be provided at the driver seat 15 side of the dashboard 14, and may include a driving speed gauge 51 configured to display a traveling speed of the vehicle 1 and a revolutions per minute (rpm) gauge 52 configured to display a rotational speed of a power device (not shown).

Also, the vehicle interior 10 may include a separate jog dial 60 configured to manipulate various devices of the vehicle 1. The jog dial 60 may be operated through a method of performing a driving operation by rotating the jog dial 60 or applying a pressure thereto, and further it may be provided with a touch pad having a touch recognition function and operated to perform handwriting recognition for the driving operation, which is input using a finger of the user or a separate tool having a touch recognition function.

A steering device for manipulating the traveling of the vehicle 1 may include a steering wheel 42 configured to receive a traveling direction that is input by the driver, a steering gear (not shown) configured to convert a rotational movement of the steering wheel 42 into a reciprocal movement, and a steering link (not shown) configured to deliver the reciprocal movement of the steering gear (not shown) to the front wheel 93. Such a steering device may change the traveling direction of the vehicle 1 by changing a direction of a rotating shaft of the steering wheel 42.

A braking device may include a brake pedal (not shown) configured to receive a brake manipulation that is input from the driver, a brake drum (not shown) coupled to the wheel, a brake shoe (not shown) configured to stop the rotation of the brake drum (not shown) using a frictional force, and the like. Such a braking device may stop the rotation of the wheel to brake the traveling of the vehicle.

As is described above, the exterior and interior configurations have been described with reference to FIGS. 1 and 2. Hereinafter, features of the present disclosure will be described with reference to the accompanying drawings.

Figure 3:
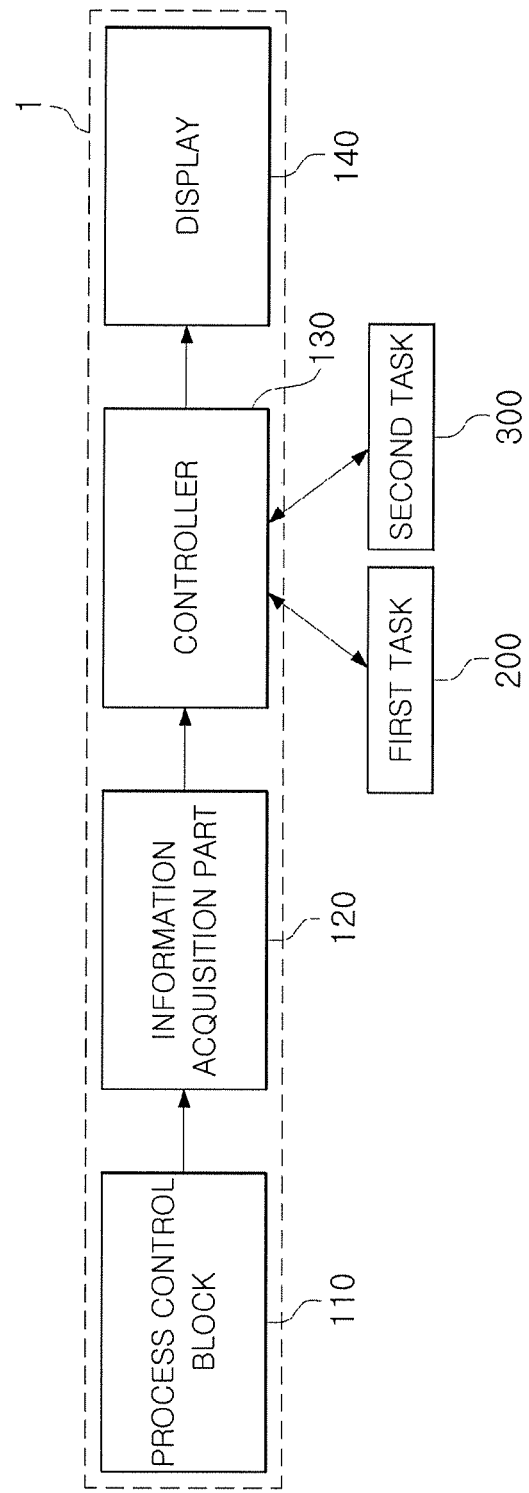
FIG. 3 is a block diagram illustrating a part of a configuration of the vehicle according to one embodiment of the present disclosure.

FIG. 3 is a block diagram illustrating a part of the configuration of the vehicle 1 according to one embodiment of the present disclosure.

Referring to FIG. 3, the vehicle 1 may include a process control block 110 configured to store information regarding one or more tasks and one or more functions which are executed in the one or more tasks, an information acquisition part 120 configured to acquire the information regarding the one or more tasks and the one or more functions from the process control block 110, a controller 130 configured to perform control to execute an unexecuted function in a second task 300 on the basis of the acquired information when a function that is not executed from the beginning or a partially executed function are present in a first task 200, and a display 140 configured to display an absence of the second task 300, in which the unexecuted function is executable, to the outside.

A process control block refers to a storage such as a RAM memory, a flash memory, a ROM memory, an erasable programmable read only memory (EPROM), an electrically erasable programmable read only memory (EEPROM), a register, a hard disk, and a removable disk, in which an operating system is able to store useful information with respect to a process. Therefore, the process control block 110 includes information regarding a current status of a process, a unique identifier thereof, a priority thereof, a pointer indicating a memory device in which the process is loaded, a pointer indicating resources allocated to the process, a storage storing register content, and the like.

When the operating system is about to handover a CPU to another process, various types of information are immediately stored in a storage that is provided in a process control block of a corresponding process, and in the future, when the corresponding process is executed again, the information stored in the storage is reused.

Therefore, the process control block 110 includes information regarding scheduling states (that is, a ready state, a running state, a waiting state, and a suspended state) required to manage a process, an identifier (ID) of a task, a CPU timer, and the like.

The information acquisition part 120 serves to acquire information regarding a task that is present in the process control block 110 and functions that are executed in the task, and transmit the acquired information to the controller 130.

In particular, the information acquisition part 120 may acquire information regarding an ID of each task, a current status of each of the tasks (that is, whether each of the tasks is in an active state or in an idle state), and start time and end time of each of the tasks from the process control block 110 by inserting instrumentation code into an operating system (OS) kernel.

Afterward, the information acquisition part 120 may acquire information regarding a type of each function that is executed in each of the tasks and an execution time of each of the functions on the basis of the acquired tasks to transmit the acquired information.

In particular, the information acquisition part 120 may acquire start time and end time of each of the functions that are executed in each of the tasks by generating an interrupt at start and end points of each of the functions and inserting the instrumentation code into which a unique function ID is input when each of the functions is started.

Figure 4A:
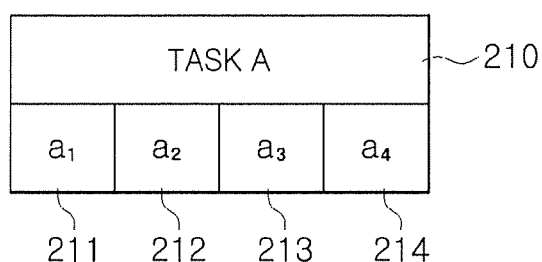
FIGS. 4A, 4B, and 4C are diagrams illustrating tasks and various functions which are executed in each of the tasks.
Figure 4B:
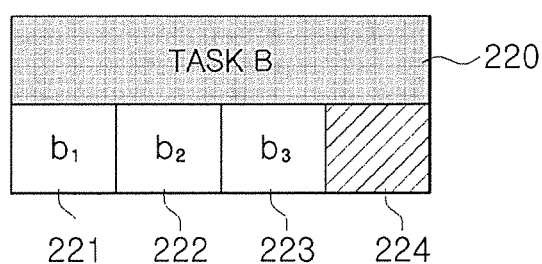
Figure 4C:
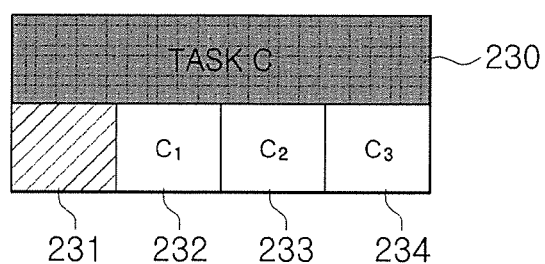

FIGS. 4A, 4B, and 4C are diagrams schematically illustrating the information, which is acquired as described above, regarding the tasks and the functions that are executed in each of the tasks.

Referring to FIGS. 4A, 4B, and 4C, each of tasks 210, 220, and 230 may include a plurality of functions. For example, as shown in FIG. 4A, four functions $a_1$, $a_2$, $a_3$, and $a_4$ are executed in Task A 210, and an entire time of Task A 210 is the same as a sum of execution times of the four functions $a_1$, $a_2$, $a_3$, and $a_4$ that are executed in Task A 210.

As shown in FIG. 4B, three functions $b_1$, $b_2$, and $b_3$ are executed in Task B 220. Since a portion 224 in which no function is executed is present in Task B 220, an entire time of Task B 220 is greater than a sum of execution times of the three functions $b_1$, $b_2$, and $b_3$ that are executed in Task B 220. Accordingly, the portion 224 may be used as a portion for executing a function that is not executed in another task. A detailed description thereof will be described below.

As shown in FIG. 4C, three functions $c_1$, $c_2$, and $c_3$ are executed in Task C 230. A portion 231 in which no function is executed is present prior to the execution of the three functions $c_1$, $c_2$, and $c_3$ in Task C 230 unlike Task B 220.

The controller 130 may perform control the first task 200, the second task 300, and the functions included in the first task 200 and the second task 300 on the basis of the acquired information regarding each of the tasks from the information acquisition part 120, and may transmit an absence of a task satisfying a requirement of the second task 300 to a display 500.

In particular, the first task 200 is referred to as a task that is a target for which the controller 130 determines whether an unexecuted function is present in at least one task, and the second task 300 is referred to as a second task 300 in which the unexecuted function is executable when present in the first task 200.

Therefore, the second task 300 should have a remaining time in which an unexecuted function is executable, that is, a characteristic in which an entire time of a task is longer than a sum of execution times of functions that are executed in the task, and the remaining time should be longer than a time required for executing the unexecuted function.

Also, the unexecuted function may specifically include a function that is not executed from the beginning, or a partially executed function.

Consequently, when an unexecuted function is present in the first task 200, the controller 130 may perform control to execute the unexecuted function in the second task 300, and, when a plurality of unexecuted functions are present in the first task 200, the controller 130 may retrieve a plurality of second tasks 300 to execute the plurality of unexecuted functions in the plurality of second tasks 300.

FIG. 5 is a flowchart illustrating an operation sequence in the vehicle according to one embodiment of the present disclosure.

Referring to FIG. 5, the vehicle 1 of the present disclosure acquires information regarding the first task 200 and information regarding functions that are executed in the first task 200 from the process control block 110 in Operation S100.

The information includes information regarding an ID of the first task 200 and a CPU timer, information regarding an entire time of the first task 200 and a current status thereof, and information regarding types of functions that are executed in the first task 200 and an execution time of each of the functions.

When the information regarding the first task 200 is acquired, it is determined whether an unexecuted function is present in the first task 200 in Operation S200.

The unexecuted function may include a function that is not executed from the beginning, or a partially executed function.

When all functions of the first task 200 that is retrieved are normally executed, the process returns to Operation S100, otherwise, when an unexecuted function is present in the first task 200, the second task 300 is retrieved in Operation S300.

The second task 300 is referred to as a second task 300 in which the unexecuted function is executable when present in the first task 200. Therefore, the second task 300 should have a remaining time in which an unexecuted function is executable, that is, a characteristic in which an entire time of a task is longer than a sum of execution times of functions that are executed in the task, and the remaining time should be longer than a time required for executing the unexecuted function.

When a second task 300 satisfying the above-described requirement is present, the unexecuted function that is not executed in the first task 200 is executed in Operations S400 and S500, otherwise, it is retrieved whether the unexecuted function is executable by other core in Operation S600.

A core is referred to as a CPU, and in the case in which the unexecuted function is executable by other core, it is executed by the other core in Operation S700, otherwise, the user is informed that the unexecuted function is not executable by the other core so that a risk is prevented in Operation S800.

Further, although not shown in the drawing, when the unexecuted function is not executable even by the other core, it may be terminated according to a preset criterion. That is, when the unexecuted function is not executable even by the other core, the CPU may be determined to be overloaded so that the unexecuted function may be terminated according to the preset criterion to prevent the CPU from being overloaded.

The preset criterion may be variously set according to a vehicle environment, and a non-critical function, a function with a least execution time or a long execution time, and the like may be determined as criteria. Also, the preset criterion may be set according to the preference of the user.

Figure 6A:
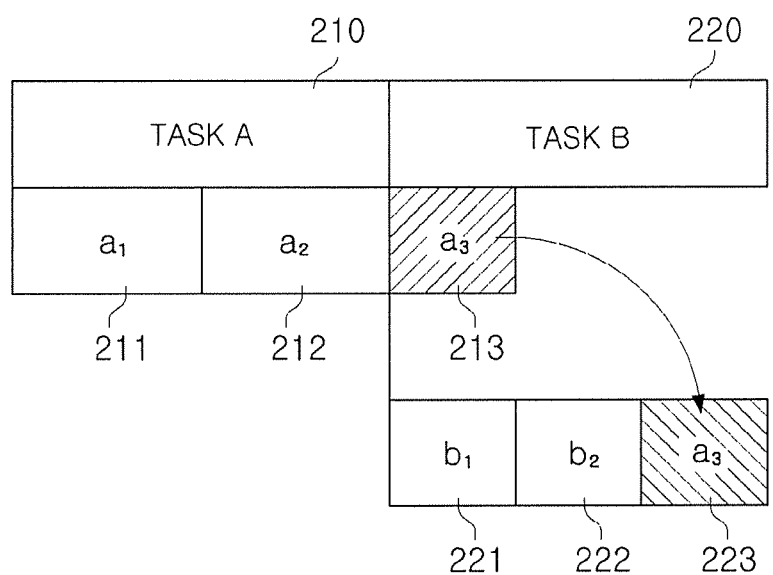
FIGS. 6A and 6B are diagrams for illustrating a principle in which a function that is not executed from the beginning and a partially executed function are executed in a second task according to a first embodiment of the present disclosure.
Figure 6B:
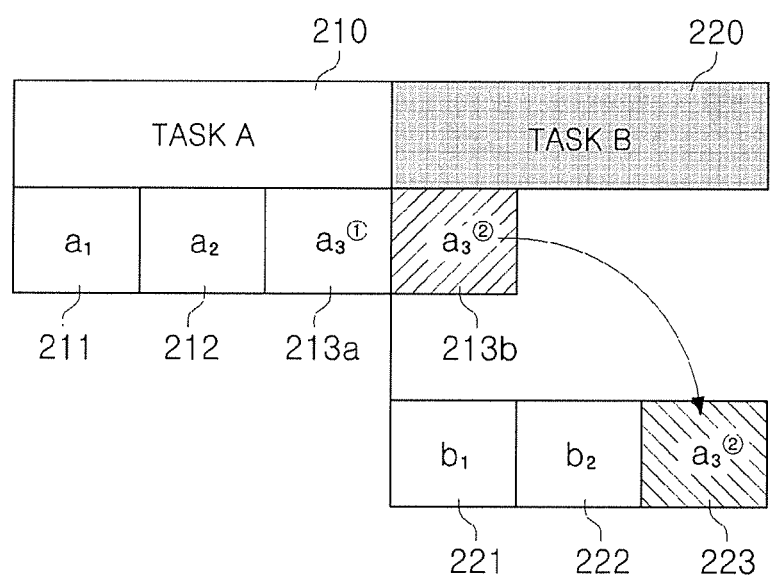

FIGS. 6A and 6B are diagrams for illustrating a principle in which an unexecuted function is executed in a second task according to a first embodiment of the present disclosure.

Referring to FIG. 6A, three functions $a_1$, $a_2$, and $a_3$ are executed in Task A 210, two functions $b_1$ and $b_2$ are executed in Task B 220, and Task B 220 has a remaining time 223 unlike Task A 210.

In principle, the three functions $a_1$, $a_2$, and $a_3$ should be executed in Task A 210, but as shown in FIG. 6A, there occurs a case in which every function is not executed during an entire time that is allocated to Task A 210. For instance, the function $a_3$ is not executed during the entire time allocated to Task A 210.

According to the related art, when an unexecuted function is present, the user is merely informed of the presence of the unexecuted function and he or she does not know whether the unexecuted function is a function $a_3$ 213, and at the same time, whether the function $a_3$ 213 could not be executed.

On the other hand, in accordance with the present disclosure, when the unexecuted function $a_3$ 213 is present as shown in FIG. 6A, Task B 220 in which an unexecuted function is executable is retrieved, and then the unexecuted function $a_3$ 213 is executed in the remaining time 223 so that there is an effect in which a more stable system may be provided. Consequently, in the case of FIG. 6A, Task B 220 becomes the second task 300.

The fundamental principle of FIG. 6B is the same as that of FIG. 6A except for a type of an unexecuted function. That is, FIG. 6A illustrates that an unexecuted function is set as the function $a_3$ that is not executed from the beginning, and is executed in Task B 220, whereas, FIG. 6B illustrates that only a portion of the unexecuted function is executed and then the remaining portion thereof is set as a remaining portion 213b so that the remaining portion 213b is executed in Task B 220. Therefore, the fundamental principles are the same as each other so that another description will be omitted.

Figure 7:
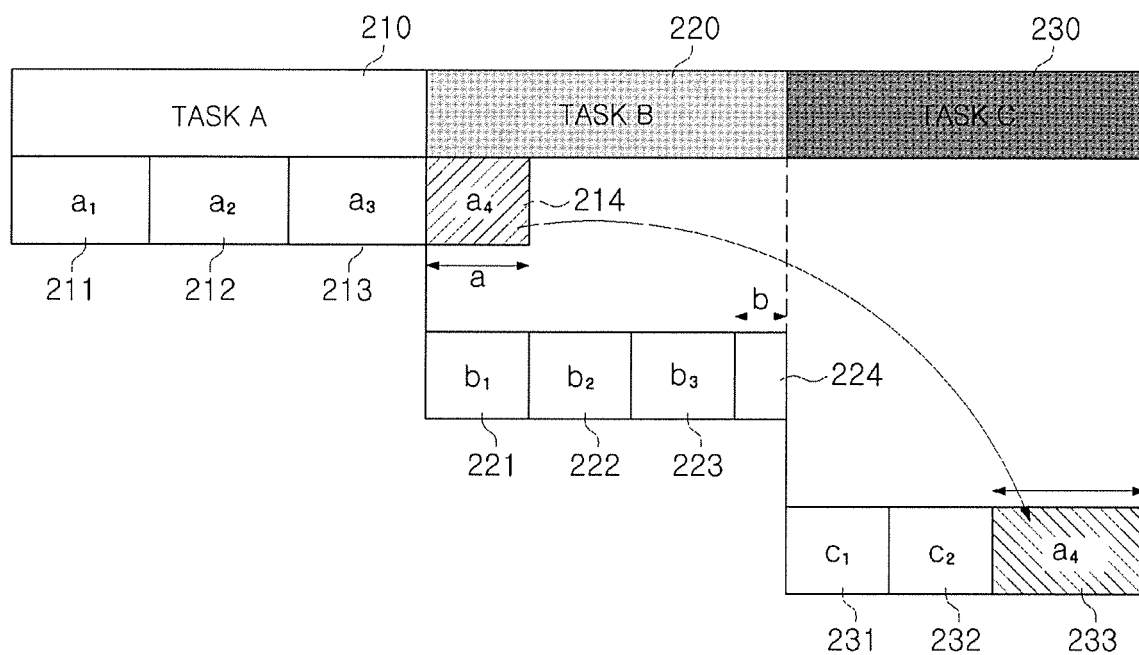
FIGS. 7 and 8 are diagrams for illustrating a principle in which a function that is not executed from the beginning and a partially executed function are executed in a second task according to a second embodiment of the present disclosure.
Figure 8:
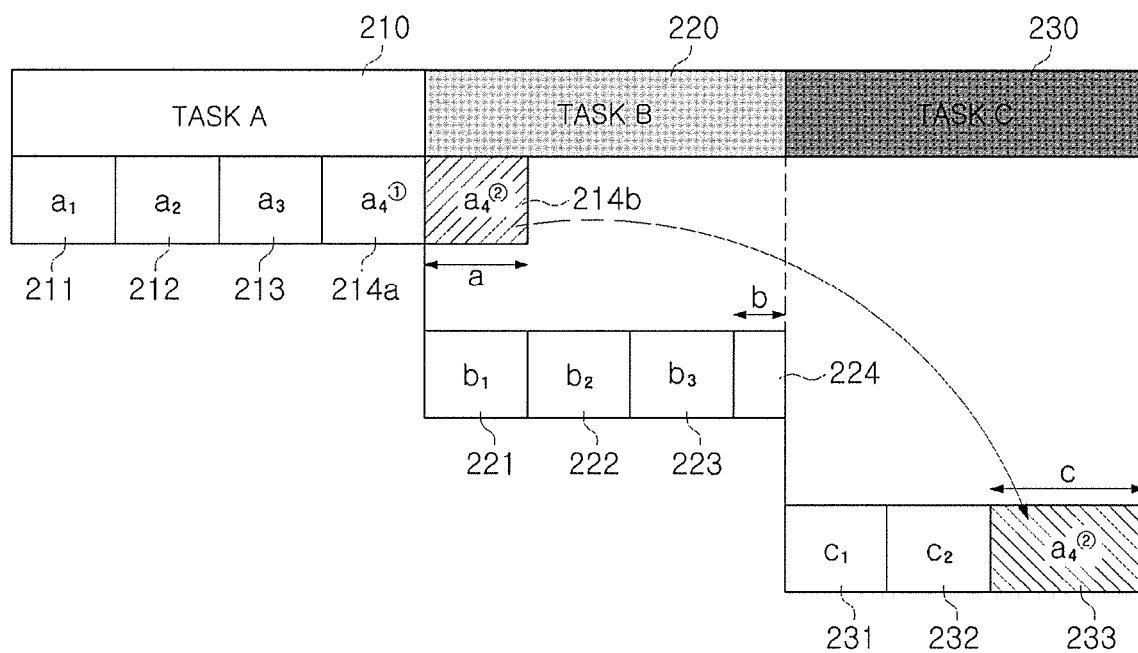

FIGS. 7 and 8 are diagrams illustrating a process of determining the second task 300 according to a second embodiment of the present disclosure.

Referring to FIG. 7, there is an unexecuted function a4 214 present in Task A 210, as in FIG. 6. Further, Task B 220 and Task C 230 each have remaining times 224 and 233.

Therefore, according to the criteria that are described in FIG. 6, both Task B 220 and Task C 230 each have the remaining times and thus they may become the second task 300, but in FIG. 7, only Task C 230 becomes the second task 300. The reason for this is that a time a is required to execute the unexecuted function $a_4$ 214, Task B 220 has only a time b that is shorter than the time a, as the remaining time, and Task C 230 has a time c that is longer than the time a. Accordingly, in the case of FIG. 7, a task that could become a second task is Task C 230.

Such a principle may be expressed as being determined by a margin rate, and the margin rate in the present disclosure refers to a ratio between an entire time of a task and a remaining time that is obtained by subtracting a total time of functions, which are executed in the task, from the entire time thereof. For example, when an entire time of the task is 1 and a total time of functions which are executed in the task is 0.8, a margin rate becomes 0.2, and, when the total time of the functions which are executed in the task is 0.4, the margin rate becomes 0.6. Therefore, as the margin rate is larger, the remaining time is increased so that it is better to set the second task 300 in which an unexecuted function is executable. Since a time is more sufficiently secured, there is an advantage capable of stably driving a system.

The fundamental principle of FIG. 8 is the same as that of FIG. 7 except for a type of an unexecuted function. That is, FIG. 7 illustrates that the unexecuted function is set as the function a4 214 that is not executed from the beginning, and is executed in Task C 230, whereas, FIG. 8 illustrates that only a portion of the unexecuted function is executed and then the remaining portion thereof is set as a remaining portion 214b so that the remaining portion 214b is executed in Task C 230. Therefore, the fundamental principle of FIG. 8 is the same as that of FIG. 7 so that another description will be omitted.

Figure 9:
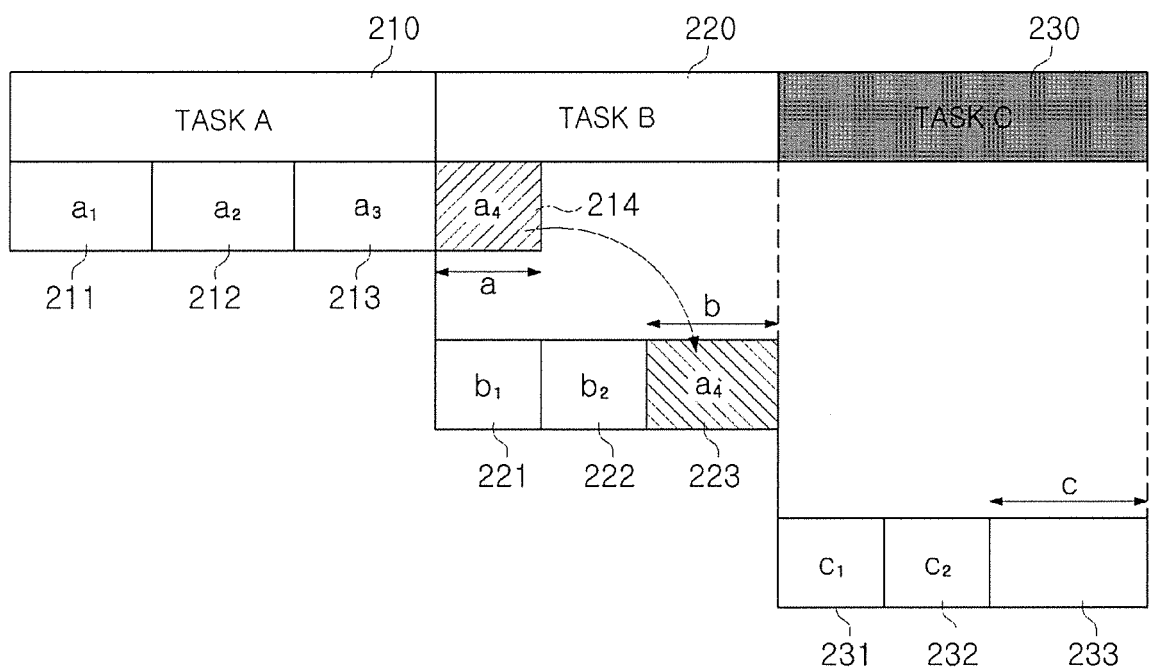
FIGS. 9 and 10 are diagrams for illustrating a principle in which a function that is not executed from the beginning and a partially executed function are executed in a second task according to a third embodiment of the present disclosure.

FIG. 9 is a diagram illustrating a process of determining the second task 300 according to a third embodiment of the present disclosure.

Referring to FIG. 9, as in FIG. 7, the unexecuted function $a_4$ 214 is present in Task A 210, and Task B 220 and Task C 230 each have remaining times 223 and 233. Further, each of a time b and a time c is longer than a time a so that the unexecuted function $a_4$ 214 may be executed in one of the remaining time 223 of Task B 220 and the remaining time 233 of Task C 230.

In such a case, however, the controller 130 may set Task B 220, which is closest to the first task 200, that is, based on Task A 210, as the second task 300 to execute the unexecuted function $a_4$ 214. The reason for this is that Task B 220 is executed prior to Task C 230 so that the unexecuted function is more rapidly executed by setting Task B 220 rather than Task C 230 as the second task 300.

Figure 10:
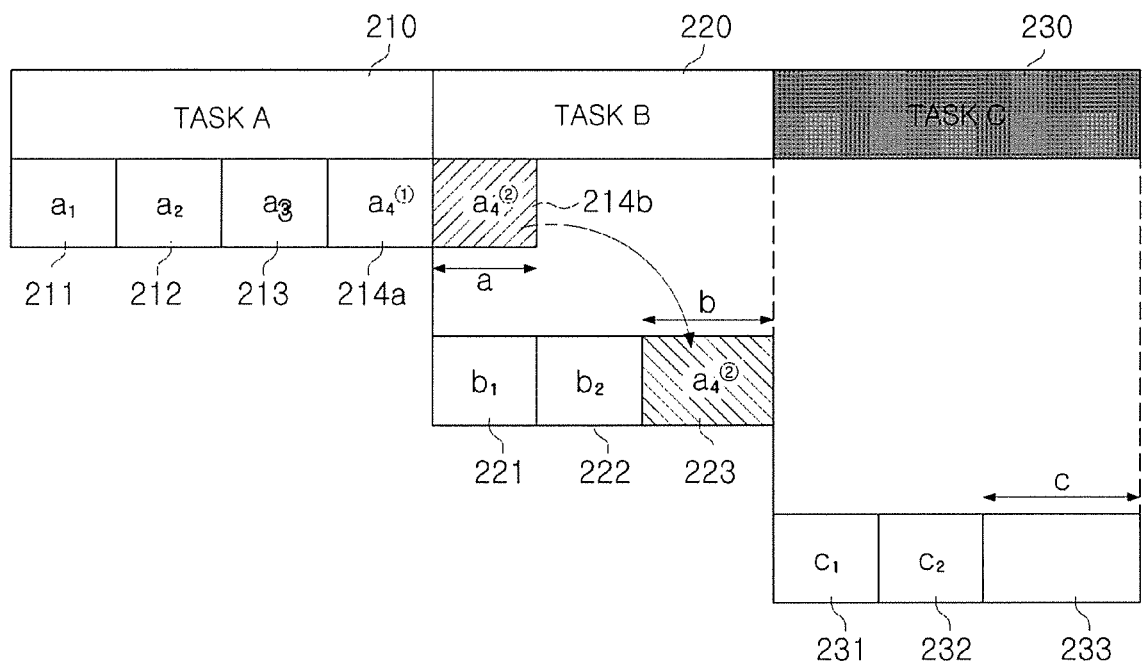

The fundamental principle of FIG. 10 is the same as that of FIG. 9 except for a type of an unexecuted function. That is, FIG. 9 illustrates that the unexecuted function is set as the function $a_4$ 214 that is not executed from the beginning, and is executed in Task B 220, whereas, FIG. 10 illustrates that only a portion of the unexecuted function is executed and then the remaining portion thereof is set as the remaining portion 214b so that the remaining portion 214b is executed in Task C 230. Therefore, the fundamental principle of FIG. 10 is the same as that of FIG. 9 so that another description will be omitted.

Figure 11:
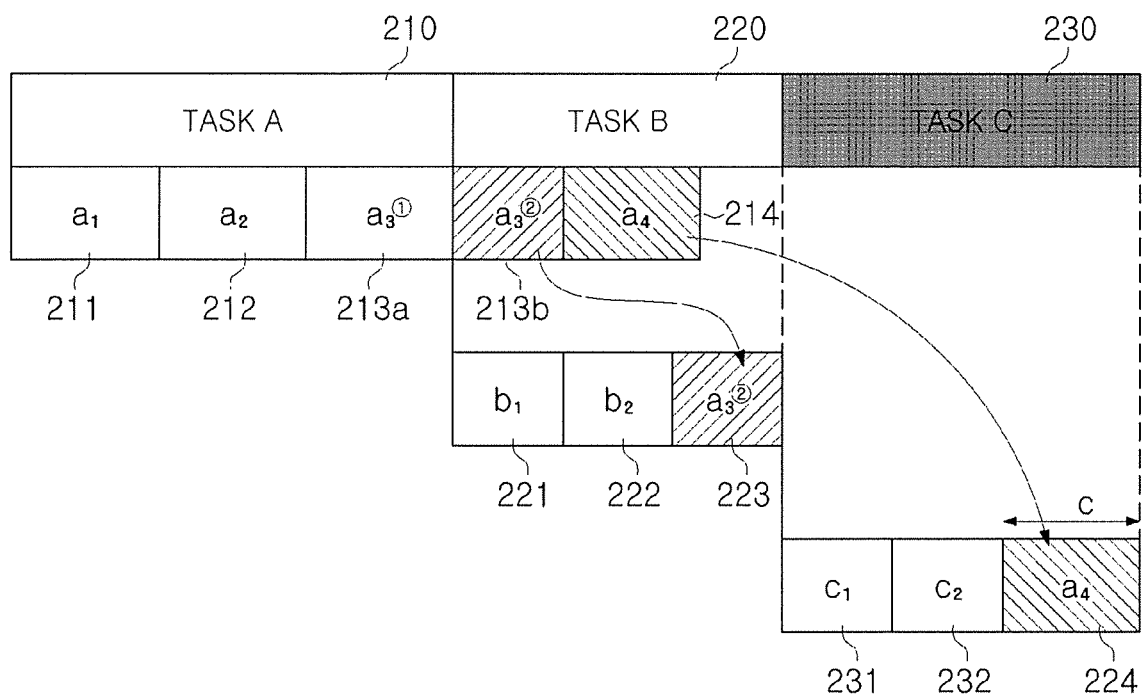
FIG. 11 is a diagram for illustrating a principle in which a function that is not executed from the beginning and a partially executed function are executed in a second task according to a fourth embodiment of the present disclosure.

FIG. 11 is a diagram illustrating a process of determining the second task 300 according to a fourth embodiment of the present disclosure.

Referring to FIG. 11, two unexecuted functions 213b and 214 are present in Task A 210, and Task B 220 and Task C 230 each have remaining times 223 and 224.

In FIG. 11, since two unexecuted functions 213b and 214 are present, the controller 130 may designate two second tasks 300. That is, in FIG. 11, Task B 220 and Task C 230 may be each designated as a second task 300.

Further, the function $a_3$ 213b among the two unexecuted functions 213b and 214, which should be executed first, may be executed in Task B 220, and the function $a_4$ 214 thereof, which should be executed second, may be executed according to the order of the two unexecuted functions 213b and 214. In this case, there is an advantage in which the system may be more stably operated since the order of the unexecuted functions is progressed without becoming entangled.

The various embodiments disclosed herein can be implemented using one or more processors coupled to a memory (or other non-transitory machine readable recording medium) storing computer-executable instructions for causing the processor(s) to perform the functions described above including the functions described in relation to the information acquisition part 120 and the controller 130 and/or to perform the operations described above with reference to the flowchart shown in FIG. 5.

Hereinabove, the features and effects of the present disclosure have been described with reference to the accompanying drawings. Since calculation information regarding an execution time of each function which is executed in a task is absent in the related art, there are many problems in that a function that is not executed beyond a target time per task is not determined, and further technology for automatically solving the problem of an execution timeout does not exist.

As is apparent from the above description, the vehicle and the control method thereof according to the embodiments of the present disclosure are capable of detecting a function that is not executed from the beginning or a partially executed function in a task to execute the function that is not executed from the beginning or the partially executed function in another task so that there is an effect in which a program may be more stably executed.

Although the embodiments have been described with reference to specific embodiments and the accompanying drawings, various variations and modifications can be derived by those skilled in the art from the above description of the present disclosure. For example, it should be understood that an appropriate result may be achieved even when the techniques described herein may be performed in a different order than the described methods, and/or that components of the described systems, structures, devices, circuits, and the like are coupled or combined in a form different from the described methods, or substituted or replaced with other components or equivalents. Therefore, other embodiments and equivalents to the claims are within the scope of the following claims.

What is claimed is:

1. A vehicle, comprising:
 a memory storing computer-executable instructions; and
 a processor coupled to the memory and configured to execute the computer-executable instructions to:
  acquire information regarding a first task and information regarding a type and an execution time of each of functions that are executed in the first task from a process control block;
  determine that a second task has a time by subtracting a sum of execution times of functions, which have to be executed in the second task, from an entire time of the second task, the time of the second task determined by the processor taken longer than a time required for executing the first function; and
  perform control to execute an unexecuted function in the second task when the unexecuted function is not executed or not completely executed in the first task but is present together with the functions that are executed in the first task,
 wherein the vehicle is applied with an automotive open system architecture (AUTOSAR) platform.

2. The vehicle of claim 1, wherein the unexecuted function includes a function that is not executed from the beginning in the first task, or a partially executed function in the first task.

3. The vehicle of claim 1, wherein the processor selects one among a plurality of tasks which has a smallest ratio of the sum of the execution times of each of the functions to the entire time, as the second task.

4. The vehicle of claim 1, wherein the processor selects one among a plurality of tasks which is closest to the first task based on the first task, as the second task.

5. The vehicle of claim 1, wherein, when a plurality of unexecuted functions are present, the processor performs control to execute the plurality of unexecuted functions in a plurality of second tasks.

6. The vehicle of claim 1, wherein, when the second task in which the unexecuted function is executable is absent, the processor executes the unexecuted function by another core which is different from a core which executes the executed functions.

7. The vehicle of claim 1, further comprising:
 a display configured to inform a user of an absence of any core that is able to execute the unexecuted function.

8. The vehicle of claim 6, wherein, when the another core able to execute the unexecuted function is absent, the processor terminates execution of the functions according to a preset order.

9. The vehicle of claim 1, wherein the processor acquires the information regarding the first task and the functions by inserting instrumentation code.

10. A method for controlling a vehicle, comprising:
 acquiring, by a processor of the vehicle, information regarding a first task and information regarding a type and an execution time of each of functions that are executed in the first task from a process control block;
 determining, by the processor, whether an unexecuted function is not executed or not completely executed in the first task but is present together with the functions that are executed in the first task;
 determining, by the processor, that a second task has a time by subtracting a sum of execution times of functions, which have to be executed in the second task, from an entire time of the second task, the time of the second task being longer than a time required for executing the first function; and
 performing, by the processor, control to execute the unexecuted function in the second task when the unexecuted function is present,
 wherein the vehicle is applied with an automotive open system architecture (AUTOSAR) platform.

11. The method of claim 10, wherein the unexecuted function includes a function that is not executed from the beginning in the first task, or a partially executed function in the first task.

12. The method of claim 10, further comprising selecting one among a plurality of tasks as the second task,
   wherein the one task having a ratio of the sum of the execution times of each of the functions to the entire time is the smallest among the plurality of tasks.

13. The method of claim 10, further comprising selecting one among a plurality of tasks as the second task,
   wherein the one task is closest to the first task based on the first task among the plurality of tasks.

14. The method of claim 10, wherein, when a plurality of unexecuted functions are present, the performing of control includes performing control to execute the plurality of unexecuted functions in a plurality of second tasks.

15. The method of claim 10, wherein, when the second task in which the unexecuted function is executable is absent, the performing of control further includes executing the unexecuted function by another core which is different from a core that executes the executed functions.

16. The method of claim 10, further comprising:
   informing a user of an absence of any core that is able to execute the unexecuted function.

17. The method of claim 15, further comprising, when the another core able to execute the unexecuted function is absent, terminating execution of the functions according to a preset order.

18. The method of claim 10, wherein the acquiring of the information includes acquiring the information regarding the first task and the functions by inserting instrumentation code.

* * * * *